United States Patent
Shibutani et al.

(12)

(10) Patent No.: US 6,809,778 B2
(45) Date of Patent: Oct. 26, 2004

(54) APPARATUS AND METHOD FOR YC SEPARATION AND THREE-LINE CORRELATION DETECTION

(75) Inventors: Ryuichi Shibutani, Osaka (JP); Nobuo Taketani, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 390 days.

(21) Appl. No.: 09/901,976

(22) Filed: Jul. 10, 2001

(65) Prior Publication Data

US 2002/0041338 A1 Apr. 11, 2002

(30) Foreign Application Priority Data

Jul. 10, 2000 (JP) ........................................ 2000-208088

(51) Int. Cl.[7] .............................................. H04N 9/78
(52) U.S. Cl. ...................................... 348/667; 348/670
(58) Field of Search ................................ 348/663–670; H04N 9/78, 9/77

(56) References Cited

U.S. PATENT DOCUMENTS 4,930,012 A * 5/1990 Fujita .......................... 348/702
5,686,972 A * 11/1997 Kim ............................. 348/663
6,108,048 A * 8/2000 Rinaldi ........................ 348/665

* cited by examiner

Primary Examiner—Victor R. Kostak
(74) Attorney, Agent, or Firm—RatnerPrestia

(57) ABSTRACT

Disclosed are an apparatus and a method for YC separation and three-line correlation detection with high accuracy, which allow the YC separator to generate reliable Y signals. The correlation detecting apparatus includes a sub-correlation detector. The detector checks input signals for the presence or absence of vertical correlation, and provides the signals with a judgment "high-correlation exists" or "otherwise". According to the judgment, the correlation detecting apparatus changes the process; i) when accepted the judgment "high-correlation exists", the apparatus determines the judgment to be reliable and adopts it as the output, ii) when accepted "otherwise", the apparatus increases its detecting accuracy and provides the signals with multi-leveled outputs according to the correlation levels. In this way, the main apparatus switches the detecting mode according to the result from sub-correlation detector, with the detecting accuracy greatly improved. This also allows the YC separator to flexibly cope with input signals.

11 Claims, 10 Drawing Sheets

APPARATUS AND METHOD FOR YC SEPARATION AND THREE-LINE CORRELATION DETECTION

FIELD OF THE INVENTION

The present invention relates to an apparatus and method for YC separation and three-line correlation detection providing luminance (often represented as Y) signals with high accuracy in luminance and chrominance signals separation, i.e., YC separation using between-lines correlation found in composite video signals.

BACKGROUND OF THE INVENTION

In recent years, three-line correlation detection has received much attention for its luminance and chrominance signals separation (YC separation) with high accuracy, which is effectively used in a cost-valued television-set having no three-dimensional YC separator with frame memory.

Now will be described an example of the prior-art three-line correlation detecting apparatus, referencing to the accompanying drawings.

FIG. 8 shows a block diagram of an YC separator employing the correlation detecting apparatus disclosed in Japanese Patent Laid-Open No. 8-65706. In the figure, receiving composite video signals as an input, three-line signal separator (three-line comb filter) 1 outputs a separated chrominance signal C'. Band-pass filter (BPF) 3 isolates high-band components from the composite video signals to output a chrominance signal C".

According to the output from correlation detector 2, i.e., the output from OR circuit 9, selector 11 chooses either the signal C' fed from three-line comb filter 1, or the signal C" fed from BPF 3 filtering chrominance signals. Selector 11 then passes the selected signal CC to one end of subtractor 15 as the chrominance signal.

The composite video signal are also fed into delay circuit 13, which controls output timing by providing the signal with a delay, and then passed to the other end of subtractor 15. Receiving the delayed composite video signal from delay circuit 13, subtractor 15 subtracts signal CC from the delayed signal to generate luminance (Y) signal.

Here will be described the object of correlation detector 2 and the structure of the three-line correlation detecting apparatus both of which are introduced in the prior-art.

Suppose that processing the composite video signal having a high correlation in a direction perpendicular to the horizontal lines—the signal with a high vertical correlation with respect to the screen—for example, an image showing vertical stripes. In this case, allowing selector 11 to output signal C' fed from three-line C separator (three-line comb filter) 1 as signal CC to subtractor 15 can generate a Y signal with a good quality.

Now suppose that processing the composite video signal with a low vertical correlation with respect to the screen—for example, an image showing one horizontal red scanning lines against a white background. If a Y signal is generated from output signal C' determined as signal CC, dot interference caused by chrominance signals occurs at the horizontal red lines on the screen—a structural weak point of three-line comb filter 1. That is, because the chrominance level of output signal C' at the horizontal red lines is decreased to half its normal value, subtractor 15 cannot completely cancel out the chrominance signal. As a result, the residual chrominance signals in the Y signal cause dot interference. In such a screen with a low vertical correlation, allowing selector 11 to output signal C" fed from BPF 3 as signal CC can generate a Y signal, with dot interference from the chrominance signal suppressed. In this case, however, the high band characteristics of the Y signal are deteriorated.

As described above, the YC separator using the correlation detecting apparatus can properly switch between output signal C' and output signal C" according to the level of the detected vertical correlation with respect to the screen, which can generate a good Y signal.

FIG. 9 is a block diagram of the YC separation circuit that is embodied in Japanese Patent Laid-Open No. 8-65706. In the figure, frame 66 surrounded by the dotted lines represents the three-line correlation detecting apparatus, the rest in the figure shows the YC separator.

FIG. 10 shows a block diagram indicating the vertical impulse detector of three-line correlation detecting apparatus 66.

In FIG. 9, the composite video signals are separated into the 0H signal, the 1H signal (delayed by delayed element 21 for one horizontal scanning period), and the 2H signal (delayed by delayed elements 21 and 23 for two horizontal scanning periods), each of which is filtered by low-pass filters (LPFs) 41, 43, and 45, respectively. The filtered signals f, g, and h—the low-band components (luminance signals) of the composite video signal passed through LPFs 41, 43, and 45, respectively—are fed into low-band vertical impulse detector 47. On the other hand, high-band components (chrominance signals) of the composite video signal, which have passed through band-pass filters (BPFs) 49, 51, and 53, have opposite phases by 1H. Inverters 55 and 57 process the signals having different phases into in-phase chrominance signals i, j, and k, all of which are fed into high-band vertical impulse detector 59.

FIG. 10 shows the structure of the vertical impulse detector, which is employed for detector 47 for low-band and detector 59 for high-band. In the figure, accepting signals f, g, and h, subtractors 71 and 73 calculate differential signals by subtracting signal f from signal g, and by subtracting signal h from signal g, respectively. Absolute-value calculators (ABSs) 75 and 77 obtain each absolute value of respective differential signals. Receiving the two values, comparators 79 and 81 compare each value with respective predetermined reference values REFs, which are predetermined by comparators 79 and 81. The two outputs from comparators 79 and 81 are applied to AND circuit 83.

To provide the detection through the process above with accuracy, exclusive NOR circuit 85 is placed between the subtractor and ABS. If circuit 85 detects that the two differential signals have same signs, the output from circuit 85 and the output from AND circuit 83 are further applied to AND circuit 87, with the final output in FIG. 10 obtained.

High-band vertical impulse detector 59 shown in FIG. 9 can be the same as the structure illustrated in FIG. 10.

The output from detector 47 and the output from detector 59 are applied to OR circuit 61, and the result is determined as the output of three-line correlation detector 66. If vertical impulse is detected either detector 47 or 59, detector 66 determines that the correlation is low. The output from detector 66 takes the form of "1" or "0": "1" indicating low correlation, "0" indicating the presence of the correlation.

As described above, the prior-art three-line correlation detecting apparatus detects correlation between the lines carrying the chrominance signal and the luminance signal of the composite video signal, and then outputs "0" or "1" depending on the presence or absence of the correlation.

According to the output from the correlation detecting apparatus, YC separator switches the filter used in separation; when accepted the output that represents the presence of the correlation, the separator uses three-line comb filter (5 tap median filter), otherwise uses BPF. In the case that a screen shows one horizontal red scanning lines against a white background described earlier, the correlation detector determines that the correlation is low, thereby uses BPF to generate the Y signal. This therefore suppresses dot interference in the Y signal. It still has, however, room for improvement in performance—a series of noises vertically generated on the screen.

The vertically generated in-series noises may occur between adjacent video processing devices. Compared to a noise occurred randomly, the noise spoils the view due to its occurrence in series on a regularly basis.

The frequency spectrum of such a noise is distributed over the range from the lower-middle band to high band of the luminance signal, especially the component of the high-band is to be an "eyesore" on the screen. In the YC separator, the Y signal generated through a comb filter has better high-band characteristics than that generated through a BPF. The fact makes noises to be conspicuous.

Because the vertically generated in-series noises have a vertical correlation, the detecting apparatus mistakenly determined that there is a correlation, accordingly the YC separator performs the separation through the comb filter. As a result, the misjudgment makes the noise conspicuous.

SUMMARY OF THE INVENTION

The present invention addresses the problem described above. It is therefore the object to provide an apparatus and method for YC separating and detecting correlation in order to accurately detect correlation between video signals, which is able to determine that the correlation is not so high as for the vertically generated in-series noises at the same time.

Now will be described the workings of the three-line correlation detecting apparatus of the present invention.

The apparatus includes a sub-correlation detector, by which input signals are sub-checked for the vertical correlation. From the sub-check, the characteristics of a signal is sub-determined to be "having a high-correlation" or "otherwise". Because the vertically in-series noises include jitter components and variations in amplitude, the sub-correlation detector is controlled to have a level of the threshold to get the determination of "otherwise". If accepted the result of "high correlation" from sub-checking, the three-line correlation detecting apparatus determines that the result can be reliable and outputs "high correlation" signal preferentially. On the other hand, as for the signals sub-determined as "otherwise", the apparatus increases the level of detecting accuracy and places the output in "m" levels according to the degree of the correlation. In this way, the vertically in-series noises are properly positioned in the m-leveled judgment.

The YC separator generates the Y signal according to the result fed from the three-line correlation detecting apparatus; i) generating the Y signal through the three-line comb filter for the signal "having a high correlation", ii) generating the Y signal through the BPF for the signal "having the least correlation", and iii) generating the Y signal by mixing the output from the comb filter with the output from the BPF, or by using a specific filter for the middle-ranged signal.

Since the three-line correlation detecting apparatus detects the vertical correlation in the chrominance signal, it is possible to detect the vertical correlation from the chrominance differential signal by isolating the chrominance signal from the composite video signal. Generally, however, the presence or absence of the vertical correlation in the chrominance signal and the luminance signal are closely related to each other. Therefore, providing the correlation detecting apparatus capable of detecting the vertical correlation of the two signals simultaneously contributes to higher accuracy in the detection.

Furthermore, incorporating the sub-correlation detector described earlier into the structure above can provide the correlation detecting apparatus with much higher accuracy and reliability.

With such structured correlation detecting apparatus, as described above, the YC separator allows to generate the Y signal with the interference minimized including dot interference, the vertically in-series noises and the noise interference of the signal having a middle-ranged vertical correlation. Thus, the practical method can provide the video images with high quality.

Basically structured the same as the three-line correlation detecting apparatus, the sub-correlation detector is primarily designed with the aim of detecting the signal having a high-correlation. From the purpose, detecting the impulse state in the differential signal between lines is not required to the sub-correlation detector; the required thing to the detector is to provide the output only if the differential signal has a small value. In addition, the sub-correlation detector has a lot common in the circuit design with the three-line correlation detecting apparatus. This allows them to share some circuits, realizing a low parts count.

The structure and workings of each component will be explained in detail in the description of the preferred embodiments of the present invention.

DESCRIPTION OF THE PREFERRED EMBODIMENTS

The preferred embodiments of the present invention are described hereinafter with reference to the accompanying drawings.

First Preferred Embodiment

Figure 1:
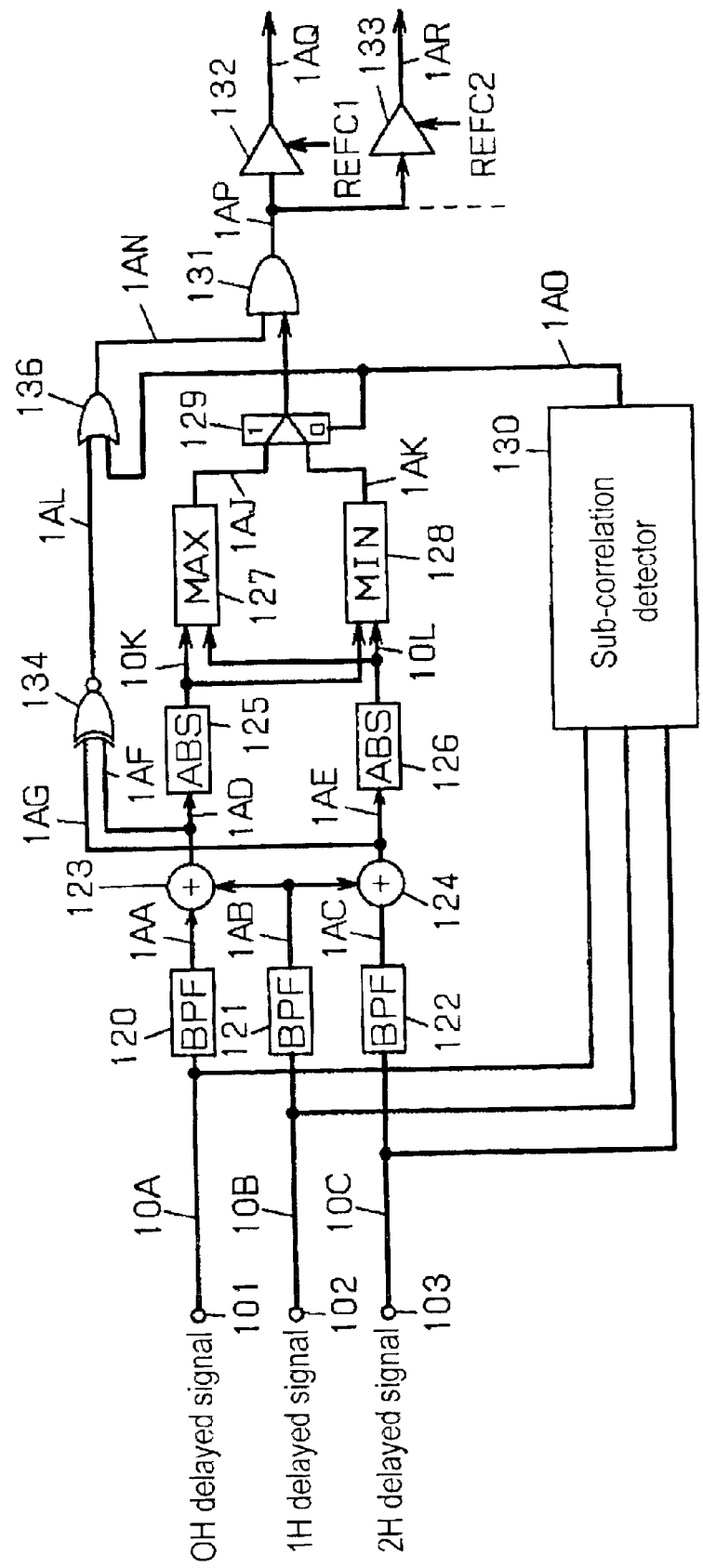
FIG. 1 is a block diagram of the three-line correlation detecting apparatus in accordance with a first preferred embodiment of the present invention.

FIG. 1 shows a block diagram of the three-line correlation detecting apparatus with the first preferred embodiment of the present invention.

Figure 5:
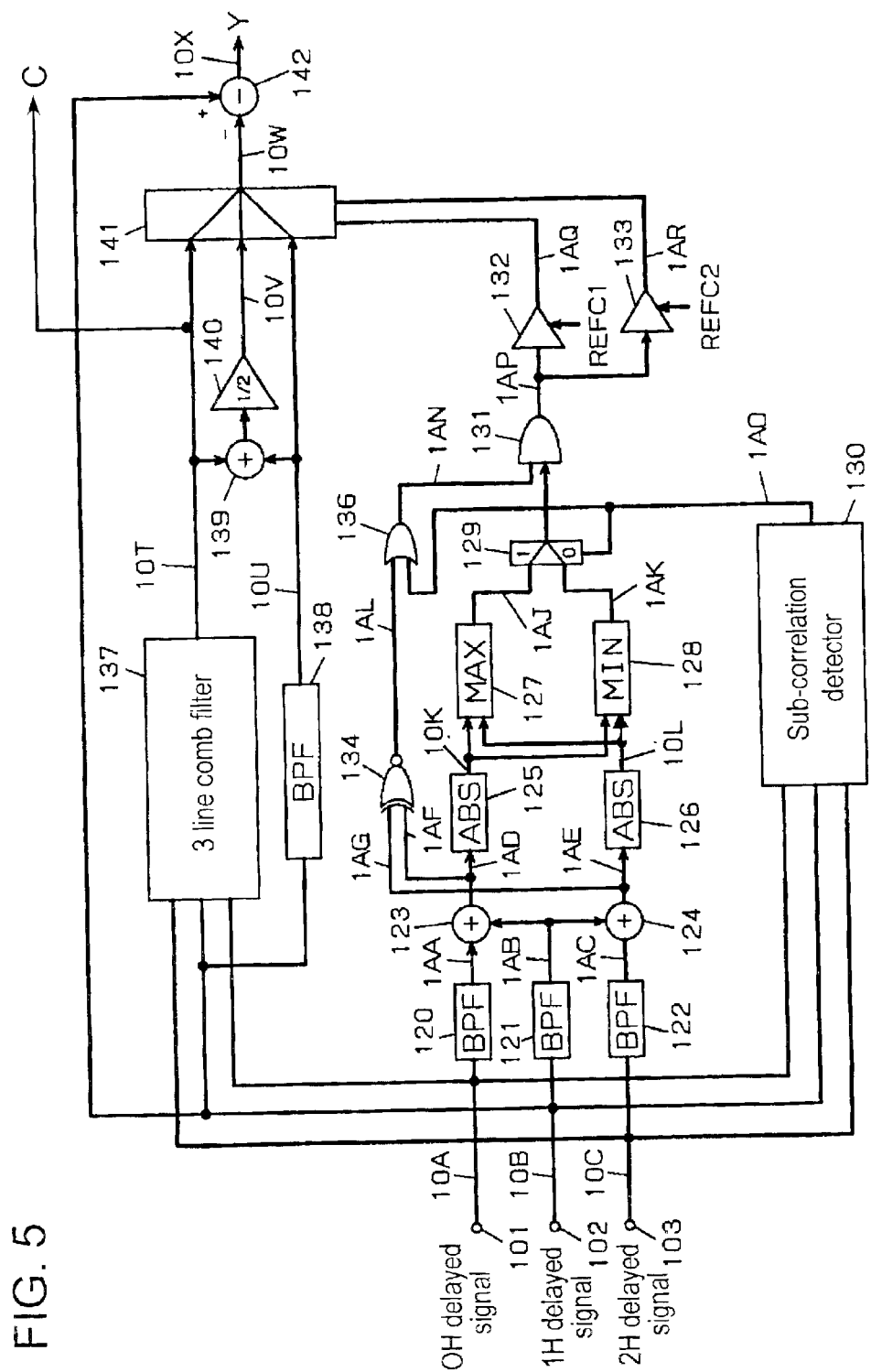
FIG. 5 is a specific block diagram of the YC separator and the three-line correlation detecting apparatus in accordance with the first preferred embodiment of the present invention.

FIG. 5 shows a block diagram of the YC separator employing the three-line correlation detecting apparatus shown in FIG. 1. Now will be described how such structured three-line correlation detecting apparatus works, referring to FIGS. 1 and 5.

FIG. 5 shows a specific example in which the detecting apparatus has three-leveled outputs, i.e., 2 bits (the number of comparaters n=2, where n takes on numeral numbers).

Suppose that the current line signal is indicated by 0H-delayed signal, the signal delayed for one horizontal scanning period is indicated by 1H-delayed signal, and the signal delayed for 2 horizontal scanning periods is indicated by 2H-delayed signal. 0H-delayed signal 10A, 1H-delayed signal 10B, and 2H-delayed signal 10C are fed into input connectors 101, 102, and 103, respectively. Band-pass filters (BPFs) 120, 121, and 122 filter the entered signals and obtain chrominance signals 1AA, 1AB, and 1AC. As the chrominance signals have opposite phases by one horizontal scanning period, the differential signal between these chrominance signals is obtained by adding each other.

That is, adder 123 calculates differential signal 1AD from signals 1AA and 1AB by adding each other. Similarly, adder 124 calculates the differential signal 1AE from signals 1AB and 1AC.

Absolute-value calculators (ABSs) 125 and 126 receive the differential signals to obtain the absolute value of the correlation difference signal. If the differential signal has a large value, there is no correlation between the input signals. Comparing the values of each differential signal 10K, 10L, MAX 127 determines the larger signal as MAX signal 1AJ. Similarly, MIN 128 determines the smaller signal as MIN signal 1AK by comparing the values of each signal 10K 10L.

On the other hand, differential signals 1AD and 1AE are fed into exclusive NOR circuit 134. Output signal 1AL from circuit 134 represents whether the vertical correlation of input signal is in the impulse state. In the impulse state, signals 1AD and 1AE have the same sign, allowing signal 1AL to take on logic "1".

0H-, 1H-, and 2H-delayed signals are also fed into sub-correlation detector 130. When detecting a high correlation between the entered signals, detector 130 outputs logic "0" as output signal 1AO so that selector 129 outputs the MIN signal protecting the detection of the main detector from misjudgment.

On the other hand, when detecting a low correlation between the signals, detector 130 outputs logic "1", by which the vertically in-series noises are escaped from being judged as "correlation exists", and selector 129 selects the output from MAX detector 127.

Furthermore, when the output from detector 130 will be applied to OR circuit 136, with the output signal from exclusive NOR circuit 134, detector 130 outputs logic "1". This invalidates the judgment of exclusive NOR circuit 134, thereby signal 1AN takes on logic "1" regardless of whether differential signals 1AD and 1AE are being in the impulse state or not.

AND circuit 131 outputs signal 1AP. When the output from OR circuit 136 is logic "1", AND circuit 131 determines the signal fed from selector 129 as the output signal, while the output from circuit 136 is logic "0", AND circuit 131 outputs a reference value.

Comparators 132 and 133 compare output signal 1AP with each reference value REFC 1 and REFC 2 (where REFC 1 is not equal to REFC 2), and outputs signals 1AQ and 1AR, respectively.

Chrominance signal 10T is obtained from three-line comb filter 137. On the other hand, chrominance signal 10U is obtained from BPF 138.

Median signal 10V, which is ranged between signal 10T and signal 10U, is obtained from adder 139 through ½ amplifier 140. The three signals 10T, 10U, and 10V are fed into selector 141. Comparators 132 and 133, where the value of REFC 1 is set to be larger than that of RFFC 2, determine the output according to the three levels below.

a) in the case of signal 1AP>REFC 1

Comparators 132 and 133 output selecting signals 1AQ and 1AR both of which take on logic "1". Receiving the two signals, selector 141 selects signal 10U. As a result, the Y signal, with dot interference and the vertically in-series noises suppressed, is obtained.

b) in the case of REFC 2<signal 1AP<REFC 1

Signal 1AQ takes on logic "0", while signal 1AR takes on logic "1". From the two signals, selector 141 selects median signal 10V. As a result, the Y signal, with dot interference and vertically in-series noises reduced to half its occurrence.

c) in the case of signal 1AP<REFC 2

This result represents that a high correlation exists. It means that the chrominance signal should taken from the output signal of the three-line comb filter 10T to generate the Y signal and signal 1AQ, 1AR take on logic "0" as a result, selector 141 selects signal 10T.

According to the embodiment, as described above, the detected result of the differential signal of the chrominance signal is controlled by the result obtained from the sub-correlation detector, then accuracy of correlation detection is improved. Furthermore, by employing two comparators having different reference values, the output from the three-line correlation detecting apparatus is subdivided into three levels.

Thus, using the output with three levels can suppress dot interference and the vertically in-series noises in the YC separator.

Second Preferred Embodiment

Figure 2:
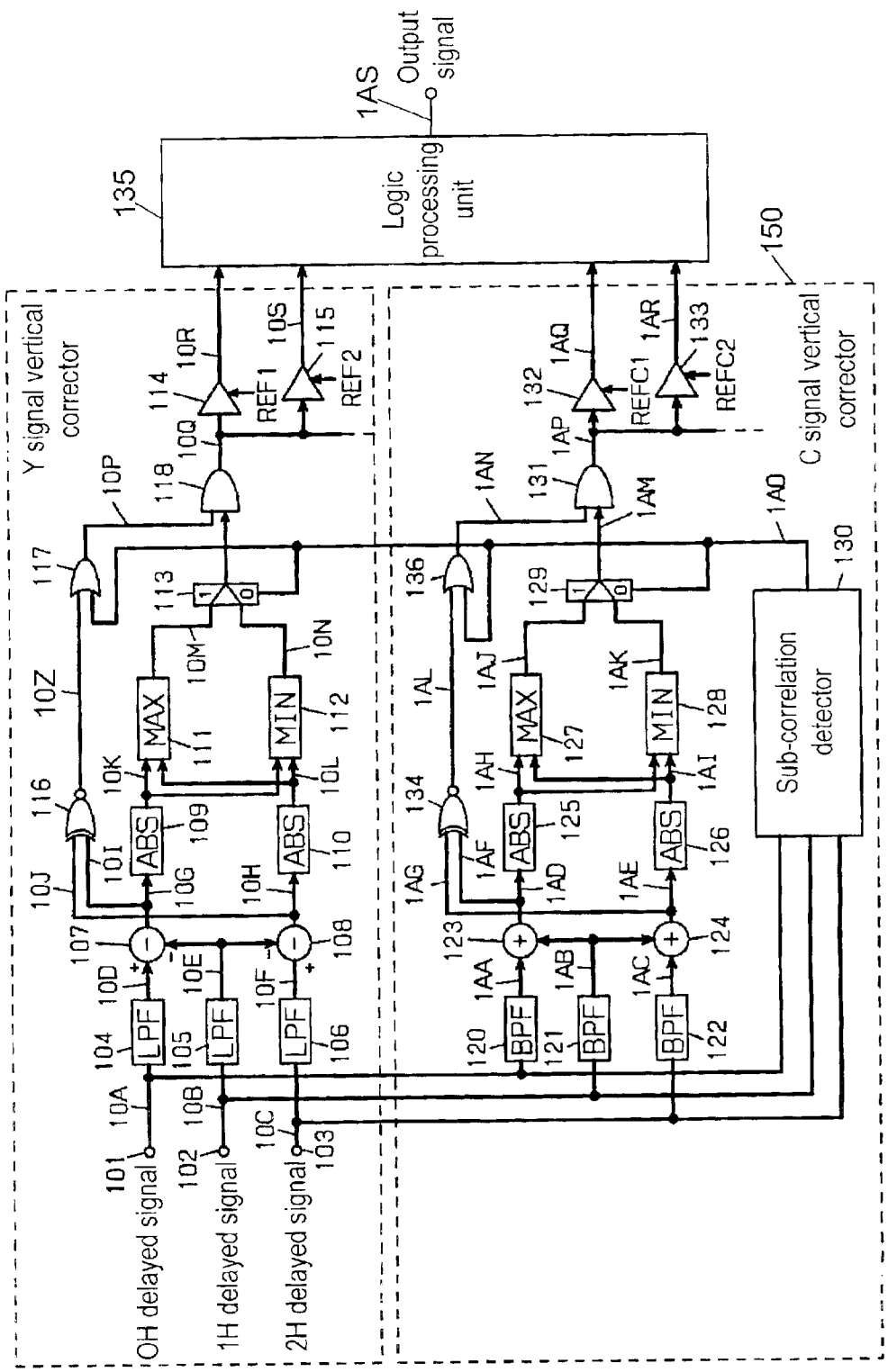
FIG. 2 is a block diagram of the three-line correlation detecting apparatus in accordance with a second preferred embodiment of the present invention.

FIG. 2 is a block diagram of the three-line correlation detecting apparatus in accordance with the second preferred embodiment of the present invention.

Figure 6:
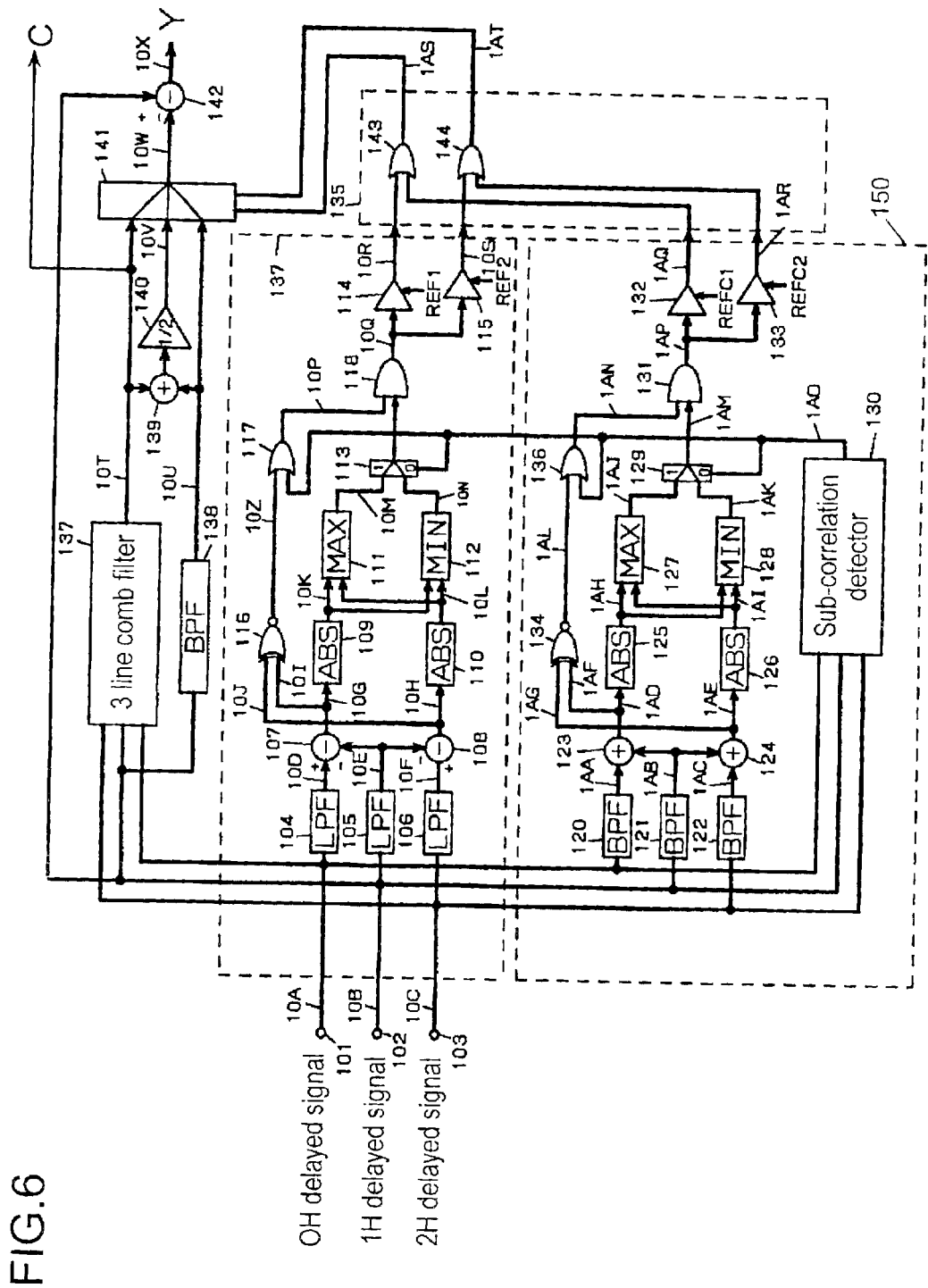
FIG. 6 is a specific block diagram of the YC separator and the three-line correlation detecting apparatus in accordance with the second preferred embodiment of the present invention.

FIG. 6 shows an YC separator employing the detecting apparatus shown in FIG. 2. Now will be described how such structured three-line correlation detecting apparatus works, referring to FIGS. 2 and 6.

FIG. 6 shows an example in which the detecting apparatus has three-leveled outputs (n=2), and employs two OR circuits 143, 144 as logic operating section 135.

As the chrominance signal vertical correlation detector 150—lower part framed by dotted lines in FIG. 6—has the structure the same as the apparatus described in the first embodiment, the explanation will be omitted.

Input signals, i.e., 0H-, 1H-, and 2H-delayed signals captured into each terminal, enter low-pass filters (LPFs) 104, 105, and 106, respectively. LPFs 104, 105, and 106 filter off the chrominance-signal band in each input signal, and output luminance signal 10D, 10E, and 10F. Receiving these luminance signals, subtractors 107 and 108 calculate luminance differential signal 10G—the difference component between 0H- and 1H-delayed signals—and signal 10H—the difference component between 1H- and 2H-delayed signals. ABSs 109 and 110 accept signals 10G and 10H to obtain each absolute value. If the obtained signal (the correlation differential signal) has a large value, there is no correlation between the input signals. Comparing the values of each correlation differential signal, MAX 111 determines the larger signal as MAX signal 10M. Similarly, MIN 112 determines the smaller signal as MIN signal 10N by comparing the values of each signal.

On the other hand, luminance differential signals 10G and 10H are fed into exclusive NOR circuit 116. Output signal 10Z from circuit 116 represents whether signals 10G and 10H are in the impulse state.

0H-, 1H-, and 2H-delayed signals are also fed into sub-correlation detector 130. When detecting a high correlation between the entered signals, detector 130 outputs logic "0" as output signal 1AO so that selector 113 outputs the MIN signal to ensure the correct functioning without misjudgment in the three-line correlation detecting apparatus.

On the other hand, when detecting a low correlation between the signals, detector 130 outputs logic "1", by which the vertically in-series noises are considerably suppressed, and selector 113 selects the output from MAX detector 111. Furthermore, when the output from detector 130 will be applied to OR circuit 117, with the output signal from exclusive NOR circuit 116, detector 130 outputs logic "1". This invalidates the judgment of exclusive NOR circuit 116, thereby signal 1AO takes on logic "1" regardless of whether differential signals 10G and 10H are being in the impulse state or not.

AND circuit 118 outputs signal 10Q. Comparators 114 and 115 compare output signal 10Q with each reference value REFC 1 and REFC 2 (where REF 1 is not equal to REF 2), and outputs signals 10R and 10S, respectively.

AND circuit 118 accepts the output from selector 113 as its input. When the output from OR circuit 117 is logic "1", AND circuit 118 determines the signal fed from selector 113 as the output signal, while the output from circuit 117 is logic "0", AND circuit 118 outputs a reference value.

Comparators 114 and 115 have reference values REF 1 and REF 2, respectively, where REF 1 is larger than RFF 2. Similarly, comparators 132 and 133 have reference values REFC 1 and REFC 2, respectively, where REFC 1 is larger than REFC 2. When the correlation is low between Y signals or between C signals, signal 10Q or signal 1AP has a large value. Comparing signals 10Q, 1AP with each reference value, the Y signal suitable for the following three levels is generated.

a) in the case of signal 10Q>REF 1, and 1AP>REFC 1

Both selecting signals 1AS and 1AT take on logic "1". Receiving the two signals, selector 141 selects signal 10U. As a result, the Y signal, with dot interference and the vertically in-series noises suppressed, is obtained.

b) in the case of REF 2<signal 10Q<REF 1, and REFC 2<signal 1AP<REFC 1

Signal 1AS takes on logic "0", while signal 1AT takes on logic "1". From the two signals, selector 141 selects median signal 10V. As a result, the Y signal, with dot interference and vertically in-series noises reduced to half its occurrence.

c) in the case of signal 10Q<REF 2, and signal 1AP<REFC 2

This represents that there is a high correlation exists. In this case, the chrominance signal detected by the three-line comb filter can be reliable. Therefore, selector 141 selects signal 10T and obtains the Y signal generated by the comb filter.

According to the embodiment, as described above, the low-band differential signal of the luminance signal is detected, at the same time, the result detected from the differential signal found in the chrominance signal is controlled with the result from the sub-correlation detector. Furthermore, the output signals detected correlation between the luminance signals and between the chrominance signals are processed in logical operation. Through the process, the output from the three-line correlation detecting apparatus is subdivided into three levels.

Thus, using the output with three levels can suppress dot interference and the vertically in-series noises in the YC separator.

Third Preferred Embodiment

Figure 3:
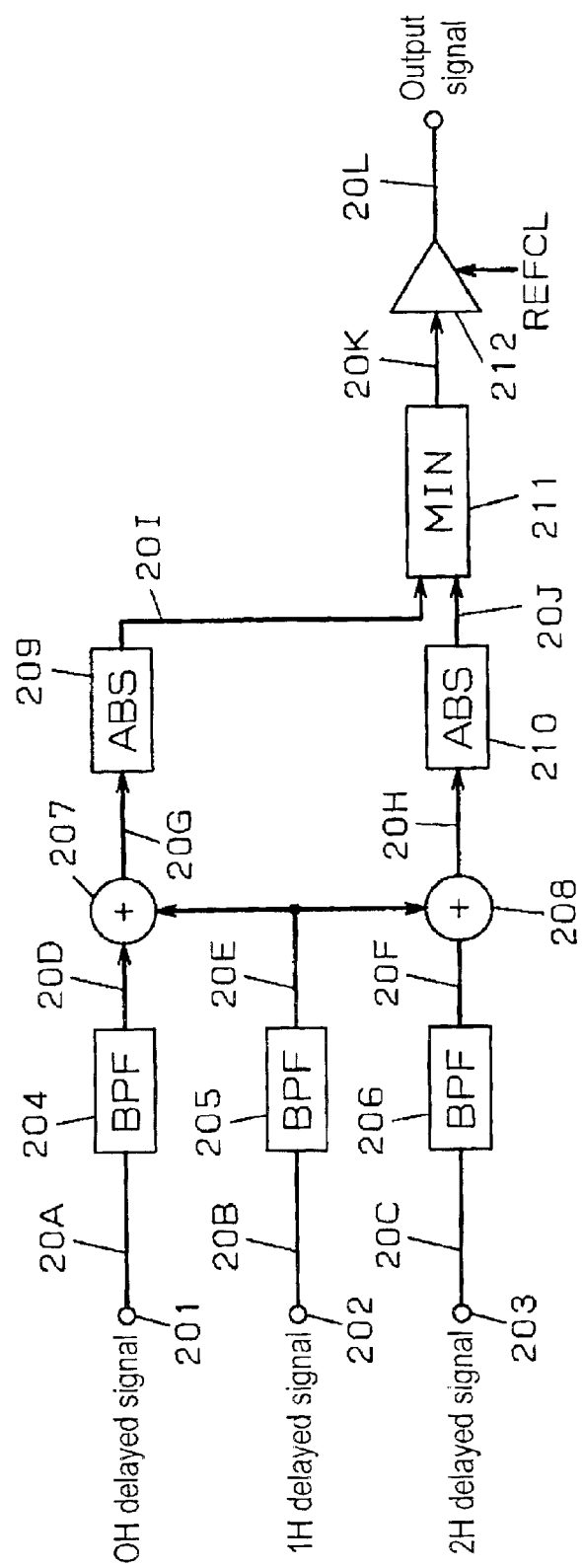
FIG. 3 is a block diagram of the three-line correlation detecting apparatus in accordance with a third preferred embodiment of the present invention.

FIG. 3 is a block diagram of the three-line correlation detecting apparatus in accordance with the third preferred embodiment of the present invention.

Referring to FIG. 3, hereinafter will be described how the sub-correlation detector works.

0H-delayed signal 20A, 1H-delayed signal 20B, and 2H-delayed signal 20C are fed into input terminals 201, 202, and 203, and then filtered by BPFs 204, 205, and 206, respectively. Adders 207 and 208 calculate 20G and 20H—between-lines chrominance differential signals—from signals 20D and 20E, from signals 20E and 20F, respectively. ABSs 209 and 210 calculate each absolute value of signals 20G, 20H and obtain signal 20I—the correlation level signal between 0H- and 1H-delayed signals—and signal 20J—the correlation level signal between 1H- and 2H-delayed signals.

If a signal having high frequency a lot, such as, a thin vertical line or diagonal line, is captured as the composite video signal, each BPF cannot filter it properly. Accepting such a signal, adders 207 and 208, which calculate the differential signal between the chrominance signal for correlation detecting, add each luminance signal component as a chrominance component. As a result, an extremely large value that indicates a low-correlation is obtained.

In order to cope with such "confusing" signals, the sub-correlation detector should be reinforced for a reliable detection. To address the problem, according to the embodiment, sub-correlation detector selects output signal 20K fed from MIN 211. Comparator 212 compares received signal 20K with its own predetermined value REFCL. If signal 20K is larger than REFCL, comparator 212 outputs control signal 20L taking on logic "1". It will be understood that signal 20L in FIG. 3 is identical with signal 1AO in FIG. 6. Allowing the sub-correlation detector to control the correlation detecting apparatus in the second preferred embodiment enhances accurate correlation detecting even for the signal indicating a vertical-line image. Furthermore, the vertically in-series noises are also properly detected, contributing to decreased noises.

Fourth Preferred Embodiment

Figure 4:
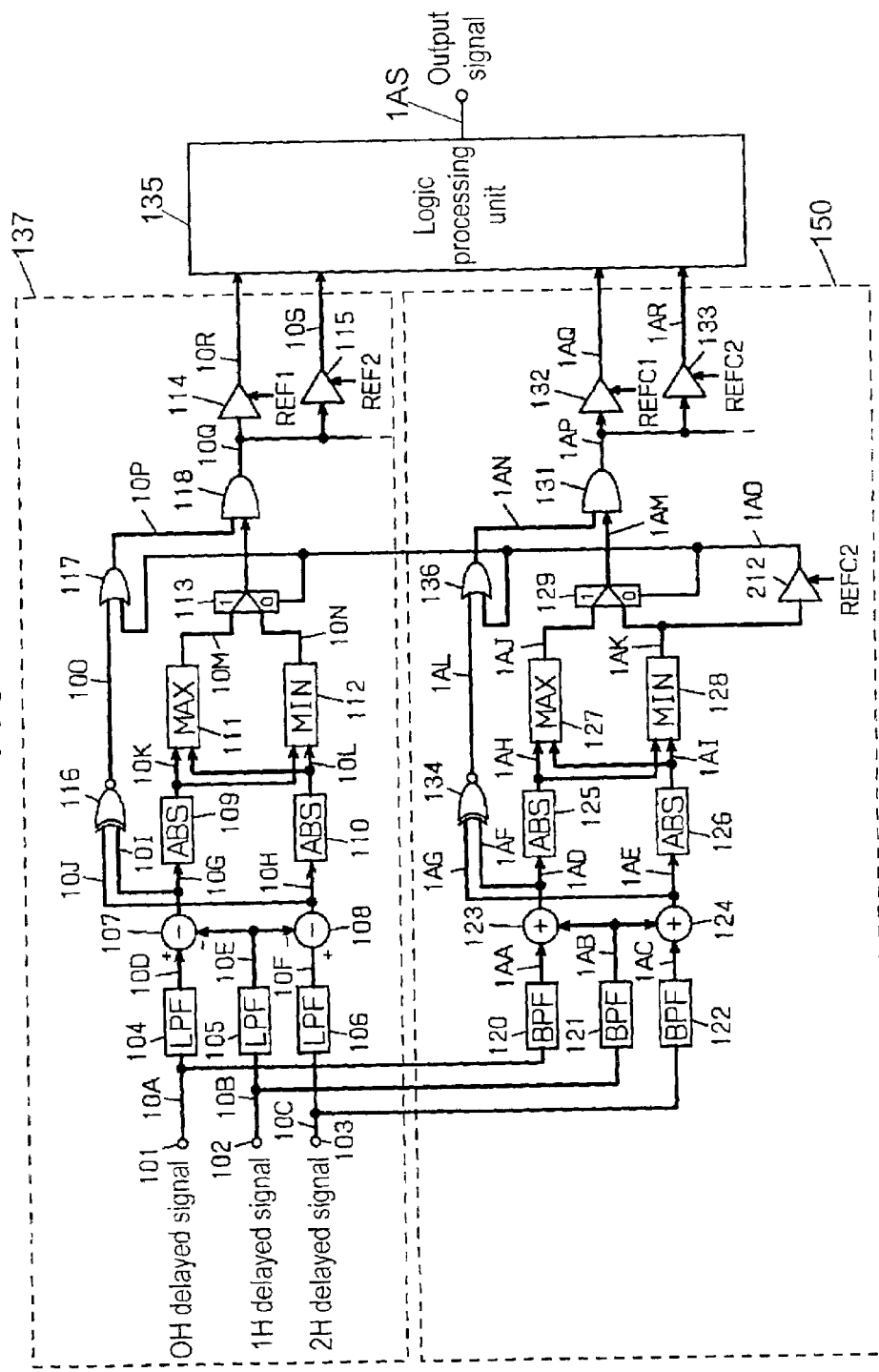
FIG. 4 is a block diagram of the three-line correlation detecting apparatus in accordance with a fourth preferred embodiment of the present invention.

FIG. 4 is a block diagram of the three-line correlation detecting apparatus in accordance with the fourth preferred embodiment of the present invention.

Figure 7:
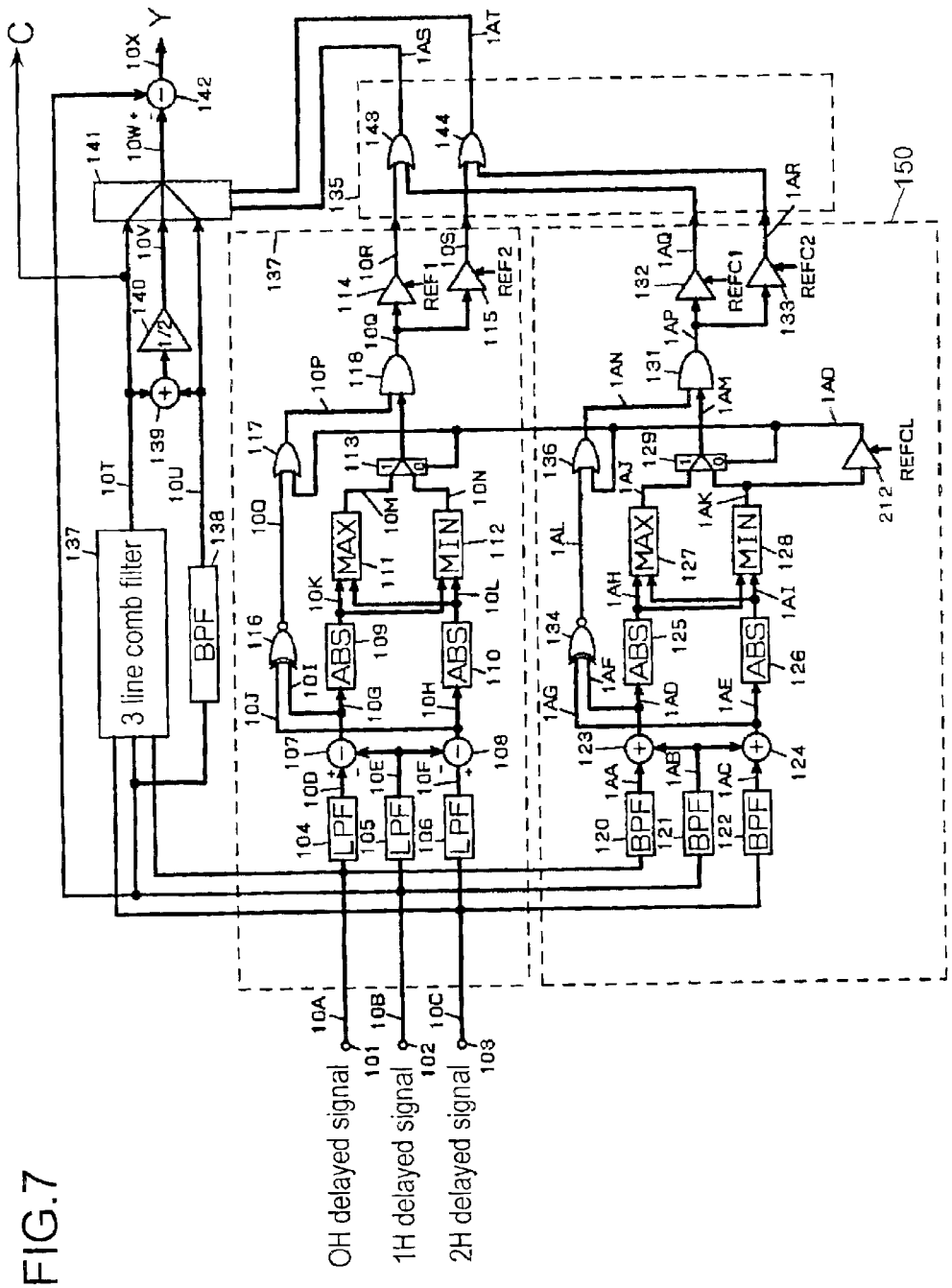
FIG. 7 is a specific block diagram of the YC separator and the three-line correlation detecting apparatus in accordance with the third preferred embodiment of the present invention.
Figure 8:
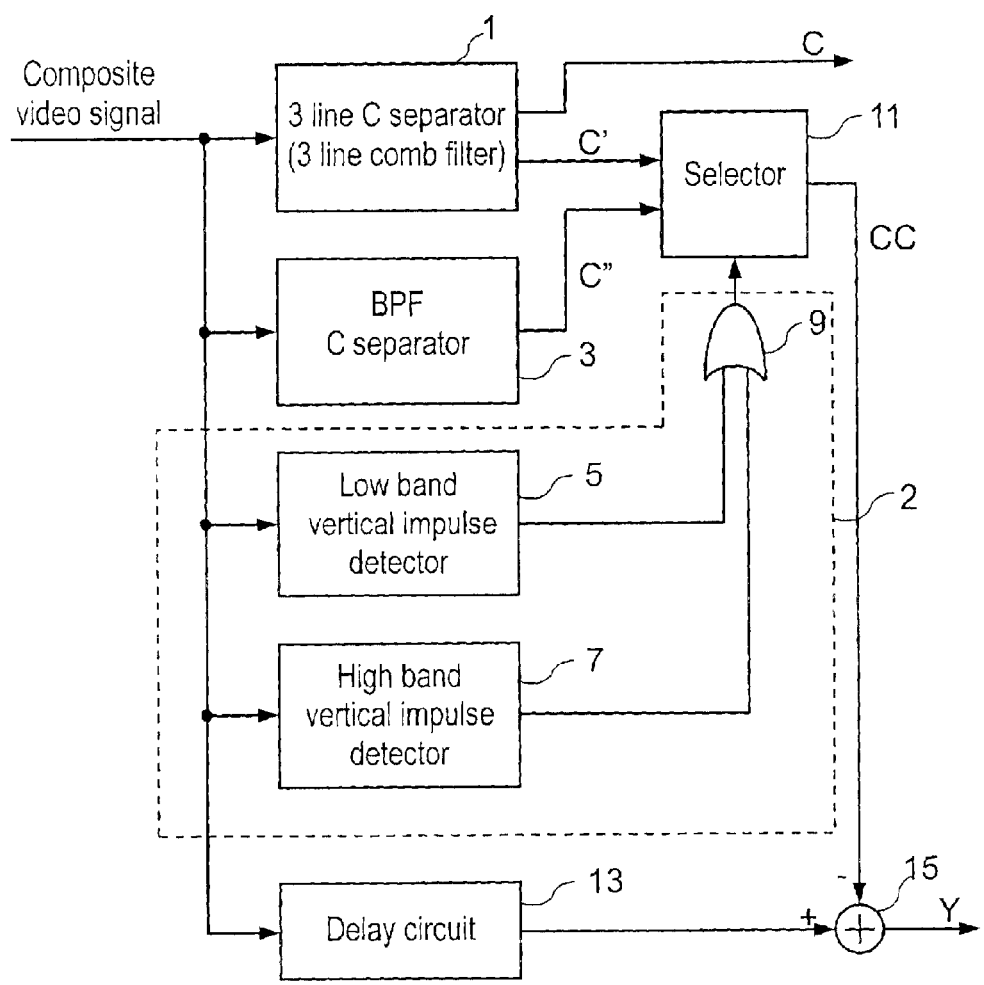
FIG. 8 is a block diagram of the prior-art YC separator and three-line correlation detecting apparatus.
Figure 9:
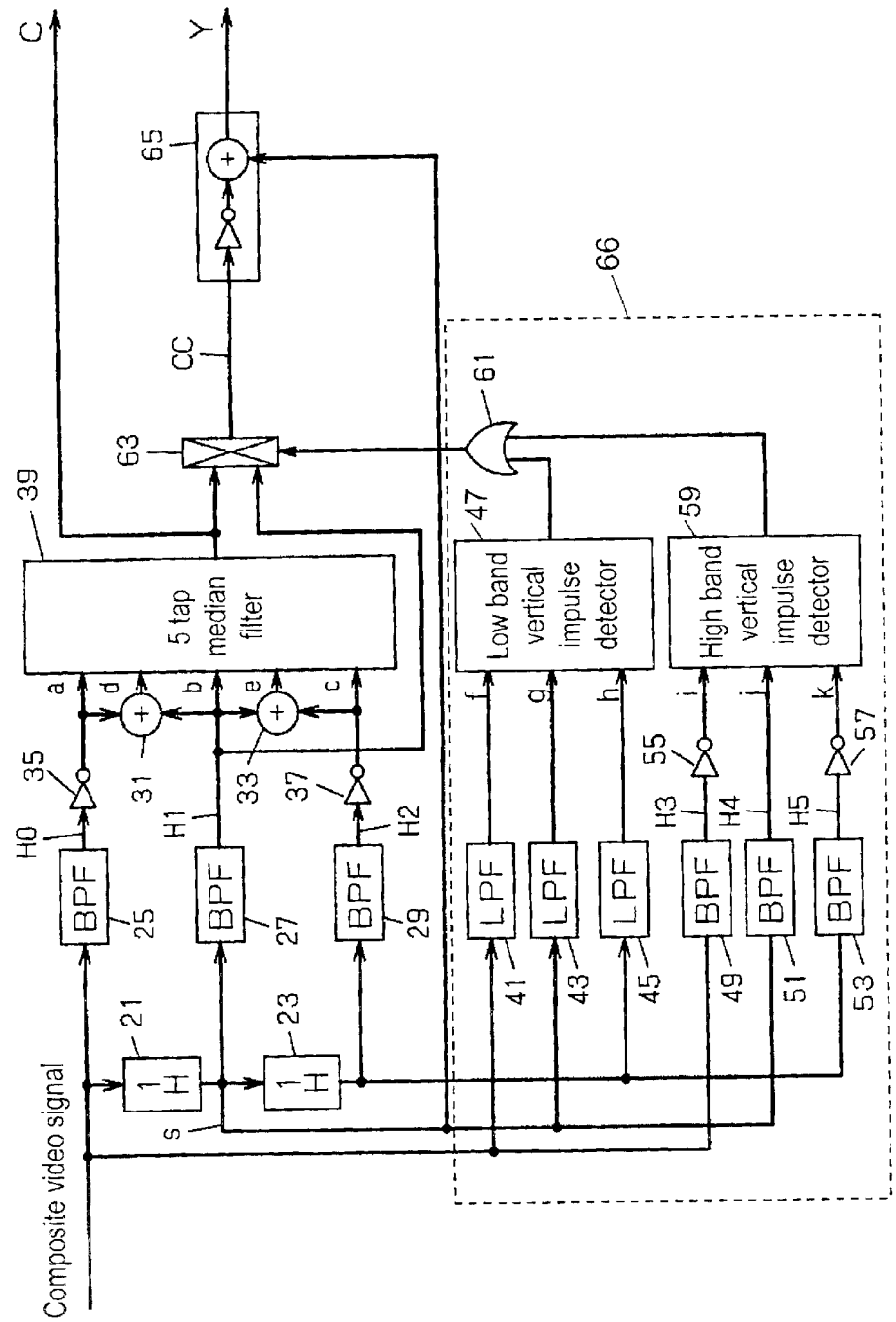
FIG. 9 is a specific block diagram of the prior-art YC separator and three-line correlation detecting apparatus.
Figure 10:
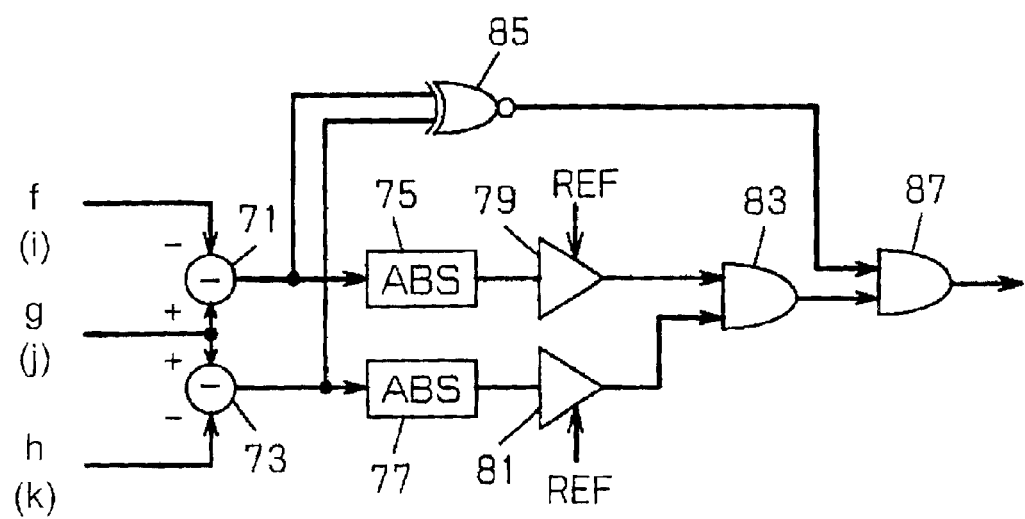
FIG. 10 is a block diagram of the prior-art three-line correlation detecting apparatus.

FIG. 7 shows the YC separator employing the three-line correlation detecting apparatus illustrated in FIG. 4. Here will be described how such structured detecting apparatus works, referring to FIGS. 2, 3 and 7.

Adapting some components in FIG. 7 to corresponding ones in FIG. 3 can form the sub-correlation detector illustrated in FIG. 3, that is: BPFs 120, 121, 122 to BPFs 204, 205, 206; adders 123, 124 to adders 207, 208; ABSs 125, 126 to ABSs 209, 210; MIN 128 to MIN 211; comparator 212 (FIG. 7) to comparator 212 (FIG. 3). That is, the working of the detecting apparatus shown in FIG. 7, which incorporates the apparatus shown in FIG. 3 into the sub-correlation detector shown in FIG. 2, is exactly the same as that of the apparatus described in the second preferred embodiment. In other words, the structure of the embodiment already satisfy the desired function for far less component count than incorporating the whole structure shown in FIG. 3 into the sub-correlation detector shown in FIG. 2.

These four embodiments of the present invention relate to an NTSC system but may also be applied to a PAL system, provided that 1H- and 2H-delayed signals as the input signals are replaced with 2H- and 4H-delayed signals, respectively.

As described above, the three-line correlation detecting apparatus of the present invention offers the sub-correlation detecting, enhancing the accuracy of correlation detecting between three lines. The apparatus can provide the multi-leveled output, by which vertical correlation detecting for the video signal and the vertically in-series noises are properly detected.

Furthermore, the three-line correlation detecting apparatus of the present invention can be applied to the YC separator separating the composite video signal. Such YC separator properly isolates the luminance signal, with noises or dot-interference significantly suppressed, from various composite video signals. As a result, a reliable video image of high quality is obtained.

What is claimed is:

1. A three-line correlation detecting apparatus controlling an YC separating system of an YC separator, the apparatus comprising:

(a) a first band-pass filter accepting a current line signal as an input, and outputting a first chrominance signal;

(b) a second band-pass filter accepting a signal generated by delaying the current line signal by one horizontal scanning period or two horizontal scanning periods, and outputting a second chrominance signal;

(c) a third band-pass filter accepting a signal generated by delaying the current line signal by two or four horizontal scanning periods, and outputting a third chrominance signal;

(d) a first absolute-value calculator determining an absolute value of a result calculated by adding an output signal from the first band-pass filter to an output signal from the second band-pass filter, and outputting the determined value;

(e) a second absolute-value calculator determining an absolute value of a result calculated by adding an output signal from the second band-pass filter to an output signal from the third band-pass filter, and outputting the determined value;

(f) a first maximum-value detector accepting output signals from the first and the second absolute-value calculators, and outputting a larger value as a maximum value;

(g) a first minimum-value detector accepting output signals from the first and the second absolute-value calculators, and outputting a smaller value as a minimum value;

(h) a sub-correlation detector accepting i) a first signal of the current line, ii) a second signal generated by delaying the current line signal by one horizontal scanning period or two horizontal scanning periods, iii) a third signal generated by delaying the current line signal by two or four horizontal scanning periods, determining a between-lines correlation signal from differentials between the first signal and the second signal, and between the second signal and the third signal, outputting a result by comparing the between-lines correlation signal with a predetermined reference value; and (i) a first selector accepting outputs from the first maximum-value calculator and the first minimum-value calculator, and selecting an output signal for controlling the YC separating system according to judgment of the sub-correlation detector.

2. The three-line correlation detecting apparatus or claim 1, the apparatus further including a predetermined number "n" of comparators (where predetermined "n" takes on any one of natural numbers), in which an output signal fed from the first selector is compared with the predetermined number "n" of respective different reference values, if the output signal is larger than the respective reference values, the comparators output logic "1", while if the output signals is smaller that the respective reference values, the comparators output logic "0", so that the YC separating system is controlled by outputs from the number "n" of comparators.

3. The three-line correlation detecting apparatus of claim 2, the apparatus further including:

(j) a first low-pass filter accepting the current line signal as an input, and passing through low-band components of the accepted signal;

(k) a second low-pass filter accepting a signal generated by delaying the current line signal by one horizontal scanning period or two horizontal scanning periods, and passing through low-band components of the accepted signal;

(l) a third low-pass filter accepting a signal generated by delaying the current line signal by two or four horizontal scanning periods, and passing through low-band components of the accepted signal;

(m) a third absolute-value calculator determining an absolute value of a result calculated by subtracting an output signal of the second low-pass filter from an output signal of the first low-pass filter, and outputting the determined value;

(n) a fourth absolute-value calculator determining an absolute value of a result calculated by subtracting an output signal of the third low-pass filter from an output signal of the second low-pass filter, and outputting the determined value;

(o) a second maximum-value detector accepting output signals from the third and the fourth absolute-value calculators, and outputting a larger value as a maximum value;

(p) a second minimum-value detector accepting output signals from the third and the fourth absolute-value calculators, and outputting a smaller value as a minimum value;

(q) a second selector accepting outputs from the second maximum-value calculator and the second minimum-value calculator, and selecting an output signal for controlling the YC separating system according to judgment of the sub-correlation detector;

(r) another predetermined number "n" of comparators (where predetermined "n" takes on any one of natural numbers) outputting "n"-bit signals for the predetermined number "n" of reference values, in which an output signal fed from the second selector is compared with predetermined number "n" of another respective different reference values, if the output signal is larger than the another respective reference values, the comparators output logic "1", while if the output signal is smaller than the respective another reference values, the comparators output logic "0"; and (s) a logic processor accepting outputs from the predetermined number "n" of comparators and from the another predetermined number "n" of comparators, outputting a result after performing a logic operation, wherein the result obtained from the logic processor controls the YC separating system.

4. The three-line correlation detecting apparatus of claim 1, the sub-correlation detector including:

another first band-pass filter accepting the current line signal as an input, and passing through components of a chrominance signal band in the accepted signal;

another second band-pass filter accepting a signal generated by delaying the current line signal by one horizontal scanning period or two horizontal scanning periods, and passing through components of the chrominance signal band in the accepted signal;

another third band-pass filter accepting a signal generated by delaying the current line signal by two or four horizontal scanning periods, and passing through components of a chrominance signal band in the accepted signal;

another first absolute-value calculator determining an absolute value of a result calculated by adding an output from the first band-pass filter to an output signal from the second band-pass filter, and outputting the determined value;

another second absolute-value calculator determining an absolute value of a result calculated by adding an output from the second band-pass filter to an output signal from the third band-pass filter, and outputting the determined value;

another minimum-value detector accepting output signals from the first and the second absolute-value calculators, and outputting a smaller value as a minimum value;

a comparator, in which an output signal fed from the another minimum-value detector is compared with another predetermined reference value, if the output signal is smaller than the another predetermined reference value, the comparator outputs logic "1", while if the output signal is larger that the another predetermined reference value, the comparator outputs logic "0".

5. The three-line correlation detecting apparatus of claim 3, the sub-correlation detector comprising:

the first band-pass filter;
the second band-pass filter;
the third band-pass filter;
the first absolute-value calculator;
the second absolute-value calculator;
the second minimum-value detector; and
another comparator, in which an output signal fed from the second minimum-value detector is compared with further predetermined reference value, if the output signal is smaller than the further predetermined reference value, the comparator outputs logic "1", while if the output signal is larger than the further predetermined reference value, the comparator outputs logic "0".

6. The three-line correlation detecting apparatus of claim 1, the apparatus further comprising:

an exclusive NOR circuit accepting input signals into the first absolute-value calculator and into the second absolute-value calculator;

an OR circuit accepting output signals from the exclusive NOR circuit and from the sub-correlation detector; and an AND circuit accepting an output signal from the first selector, i) if an output from the OR circuit is logic "1", the AND circuit outputs the output signal from the first selector, and ii) if the output from the OR circuit is logic "0", the AND circuit outputs a predetermined reference value.

7. The three-line correlation detecting apparatus of claim 3, the apparatus further comprising:

another exclusive NOR circuit accepting input signals into the third absolute-value calculator and into the fourth absolute-value calculator;

another OR circuit accepting output signals from the another exclusive NOR circuit and from the sub-correlation detector; and another AND circuit accepting an output signal from the second selector, i) if an output from the another OR circuit is logic "1", the another AND circuit outputs the output signal from the second selector, and ii) if the output from the another OR circuit is logic "0", the another AND circuit outputs a predetermined reference value.

8. A three-line correlation detecting method controlling an YC separator system of a YC separator, the method comprising the steps of:

(a) obtaining a first chrominance signal by filtering a current line signal;

(b) obtaining a second chrominance signal by filtering a signal generated by delaying the current line signal by one horizontal scanning period or two horizontal scanning periods;

(c) obtaining a third chrominance signal by filtering a signal generated by delaying the current line signal by two or four horizontal scanning periods;

(d) determining an absolute value of a result calculated by adding the first chrominance signal to the second chrominance signal;

(e) determining an absolute value of a result calculated by adding the second chrominance signal to the third chrominance signal;

(f) determining a larger value as a maximum value by comparing the absolute value obtained in step (d) with the absolute value obtained in step (e);

(g) determining a smaller value as a minimum value by comparing the absolute value obtained in step (d) with the absolute value obtained in step (e);

(h) accepting a first signal of the current line signal, a second signal generated by delaying one horizontal scanning period or two horizontal scanning periods, and a third signal generated by delaying two or four horizontal scanning periods, detecting a between-lines correlation signal from differentials between the first signal and the second signal, between the second signal and the third signal, and then determining a result by comparing the between-lines correlation signal with a predetermined reference value; and (i) determining an output signal by selecting any one of the maximum value obtained in step (f) and the minimum value obtained in step (g) according to the result determined in step (h) to control the YC separating system.

9. The three-line correlation detecting method of claim 8 wherein the output signal determined in step (i) is compared with the predetermined number "n" of respective different reference values (where predetermined "n" takes on any one of natural numbers), if the output signal is larger than the respective reference values, a controlling signal taking on logic "1" is obtained, if the output signal is smaller than the respective reference values, a controlling signal taking on logic "0" is obtained, and thus determined the number "n" of controlling signals control the YC separating system.

10. The three-line correlation detecting method of claim 9, the method further comprising:

(j) obtaining a first low-band component signal from the current line signal;

(k) obtaining a second low-band component signal from a signal generated by delaying the current line signal by one horizontal scanning period or two horizontal scanning periods;

(i) obtaining a third low-band component signal from a signal generated by delaying the current line signal by two or four horizontal scanning periods;

(m) determining an absolute value of a result calculated by subtracting the second low-band component signal from the first low-band component signal;

(n) determining an value of a result calculated by subtracting the third low-band component signal from the second low-band component signal;

(o) determining a larger value as a maximum value by comparing the absolute value obtained in step (m) with the absolute value obtained in step (n);

(p) determining a smaller value as a minimum value by comparing the absolute value obtained in step (m) with the absolute value obtained in step (n);

(q) determining another output signal by selecting any one of the maximum value obtained in step (o) and the minimum value obtained in step (p) according to the result determined in step (p); and (r) comparing the another output signal with the predetermined number "n" of another respective different reference values (where predetermined "n" takes on any one of natural numbers), if the another output signal is larger than the another respective reference values, another controlling signal taking on logic "1" is obtained, if the another output signal is smaller than the another respective reference values, another controlling signal taking on logic "0" is obtained; and (s) controlling the YC separating system according to the number "n" of controlling signals and the number "n" of another controlling signals.

11. The three-line correlation detecting method of claim 8, the step (h) further comprising the steps of:

(h1) obtaining another first chrominance signal by filtering a current line signal;

(h2) obtaining another second chrominance signal by filtering a signal generated by delaying the current line signal by one horizontal scanning period or two horizontal scanning periods;

(h3) obtaining another third chrominance signal by filtering a signal generated by delaying the current line signal by two or four horizontal scanning periods;

(h4) determining another first absolute value of a result calculated by adding the another first chrominance signal to the another second chrominance signal;

(h5) determining another second absolute value of a result calculated by adding the another second chrominance signal to the another third chrominance signal;

(h6) determining a smaller value as a minimum value by comparing the another first absolute value with the another second absolute value; and (h7) comparing the minimum value obtained in step (h6) with another predetermined reference value, if the minimum value is smaller than the another predetermined reference value, outputting logic "1", if the minimum value is larger than the another predetermined reference value, outputting logic "0".

* * * * *

UNITED STATES PATENT AND TRADEMARK OFFICE
CERTIFICATE OF CORRECTION

PATENT NO.     : 6,809,778 B2
DATED          : October 26, 2004
INVENTOR(S)    : Ryuichi Shibutani et al.

It is certified that error appears in the above-identified patent and that said Letters Patent is hereby corrected as shown below:

Column 10,
Line 8, delete "or" and insert -- of --.

Signed and Sealed this

Twenty-fourth Day of May, 2005

JON W. DUDAS
*Director of the United States Patent and Trademark Office*